(12) United States Patent
Fernandez

(10) Patent No.: US 6,321,625 B1
(45) Date of Patent: Nov. 27, 2001

(54) WRENCH FOR MYERS NUT

(75) Inventor: Steven A. Fernandez, Texarkana, TX (US)

(73) Assignee: Marla K. Fernandez, Texarkana, TX (US)

( * ) Notice: Subject to any disclaimer, the term of this patent is extended or adjusted under 35 U.S.C. 154(b) by 0 days.

(21) Appl. No.: 09/817,568

(22) Filed: Mar. 26, 2001

(51) Int. Cl.$^7$ ................................................. B25B 13/48
(52) U.S. Cl. .......................... 81/176.2; 81/121.1; 81/124.6
(58) Field of Search ............................. 81/176.1, 176.15, 81/176.2, 121.1, 124.6

(56) References Cited

U.S. PATENT DOCUMENTS

| | | | |
|---|---|---|---|
| 3,354,757 | * | 11/1967 | Grimm et al. ........................ 81/176.1 |
| 4,616,535 | * | 10/1986 | Chiavon ............................... 81/121.1 |
| 4,693,655 | * | 9/1987 | Omori .................................. 411/429 |
| 5,012,704 | * | 5/1991 | Wing .................................... 81/124.6 |
| 5,862,721 | * | 1/1999 | Kowats ................................ 81/121.1 |
| 6,017,177 | * | 1/2000 | Lanham ............................... 81/121.1 |

* cited by examiner

*Primary Examiner*—Joseph J. Hail, III
*Assistant Examiner*—Joni B. Danganan
(74) *Attorney, Agent, or Firm*—Michae A. O'Neil

(57) ABSTRACT

A tool for engaging and disengaging MYERS HUB fasteners comprises a cylindrical body having a front end and a rear end. The front end comprises a cylindrical cavity having dimensions substantially identical to the dimensions of the MYERS HUB fastener for snugly receiving the MYERS HUB fastener during engagement and disengagement thereof. The rear end of the cylindrical body comprises a drive lug including a hexagonal exterior surface and a square aperture extending therethrough for engagement by conventional wrenches and conventional ratchet wrenches, respectively.

1 Claim, 2 Drawing Sheets

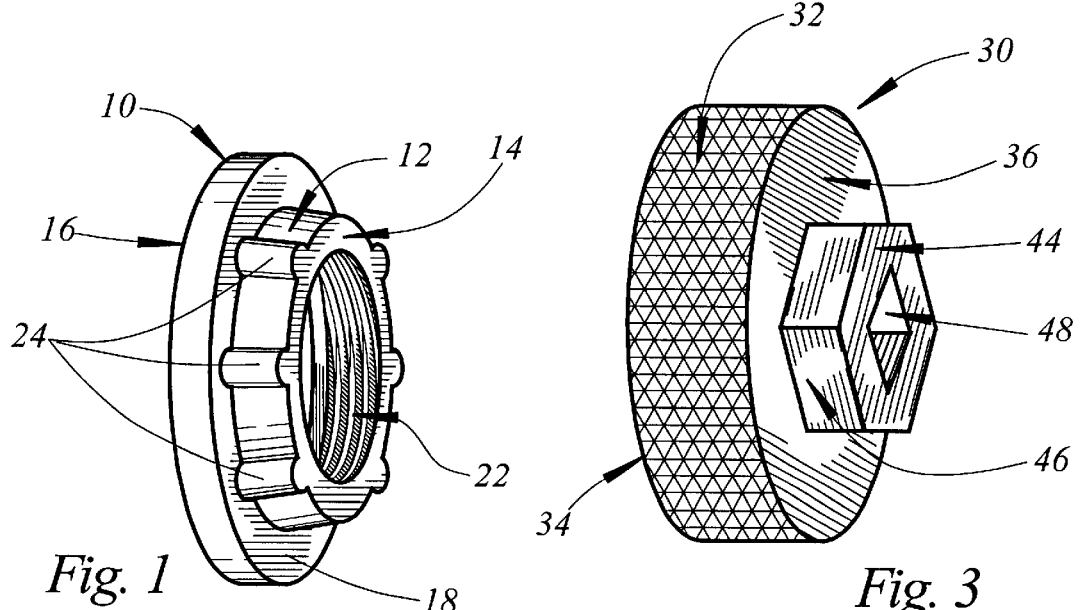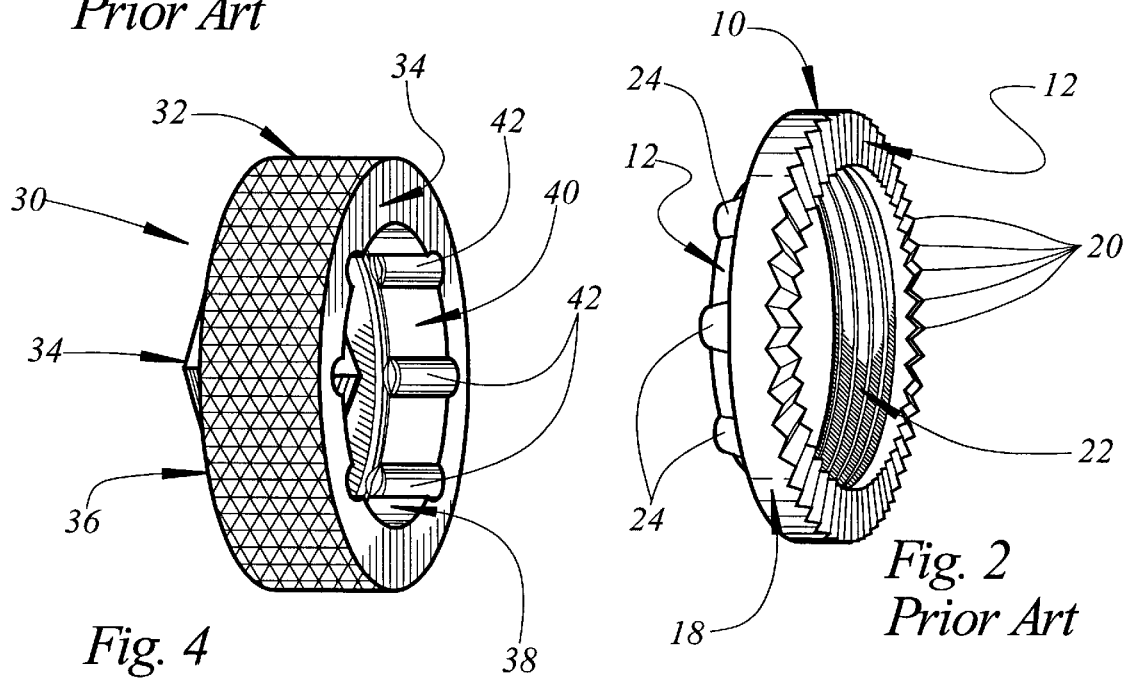

WRENCH FOR MYERS NUT

TECHNICAL FIELD

This invention relates generally to the class of hand tools known as wrenches, and more particularly to a wrench for use in conjunction with fasteners of the type known as the MYERS HUB fastener.

BACKGROUND AND SUMMARY OF THE INVENTION

In the electrical contracting trade, the fastener or choice is the MYERS HUB fastener which is employed almost universally to connect conduit and other types of electrical devices having electrical conductors extending therethrough to junction boxes, outlet boxes, switch boxes, and the like. The MYERS HUB fastener comprises a cylinder having a flange at one end. Radially extending teeth are positioned at equally spaced intervals around the end surface of the flange to provide a lock nut function. The interior of the cylinder is threaded for use in connecting various electrical devices one to another. The exterior of the cylinder has a plurality of longitudinally extending, semi-circular shaped projections located at equally spaced intervals around its circumference.

Heretofore MYERS HUB fasteners have been engaged and disengaged utilizing hand tools such as pliers and wrenches. Most often the particular type of pliers known as channel lock pliers is used. The jaws of the pliers are engaged with the projections on the exterior surface of the cylinder of the MYERS HUB fastener and are thereafter used to apply torque to the MYERS HUB fastener.

The use of conventional hand tools, and channel lock pliers in particular, to engage and disengage the MYERS HUB fastener is problematic at best. For example, the use of channel lock pliers with a MYERS HUB fastener often results in stripping the projections from the exterior of the cylinder of the MYERS HUB fastener which renders the MYERS HUB fastener almost impossible to remove. A related problem involves slippage between the channel lock pliers and the MYERS HUB fastener which can lead to damage to parts and equipment and injury to the operator.

The present invention comprises a tool for engaging and disengaging the MYERS HUB fastener which overcomes the foregoing and other problems which have long since characterized the prior art. In accordance with the invention there is provided a cylindrical tool having a cylindrical opening in one end thereof. The cylindrical opening of the tool is matched to the dimensions of the cylinder of a particular size of MYERS HUB fastener, and has longitudinally extending, semi-circular shaped cavities formed at equally spaced points around its circumference which are dimensioned to receive the projections of the MYERS HUB fastener. The opposite end of the tool comprises a hexagonal lug having a square aperture formed therethrough, thereby adapting the tool For actuation by conventional wrenches and ratchet wrenches.

BRIEF DESCRIPTION OF THE DRAWINGS

A more complete understanding of the invention may be had by reference to the following Detailed Description when taken in conjunction with the accompanying Drawings, wherein:

FIG. 1 is a front perspective view of a MYERS HUB fastener;

FIG. 2 is a rear perspective view of the MYERS HUB fastener of FIG. 1;

FIG. 3 is a rear perspective view of the tool of the present invention;

FIG. 4 is a front perspective view of the tool of FIG. 3;

DETAILED DESCRIPTION

Figure 5:
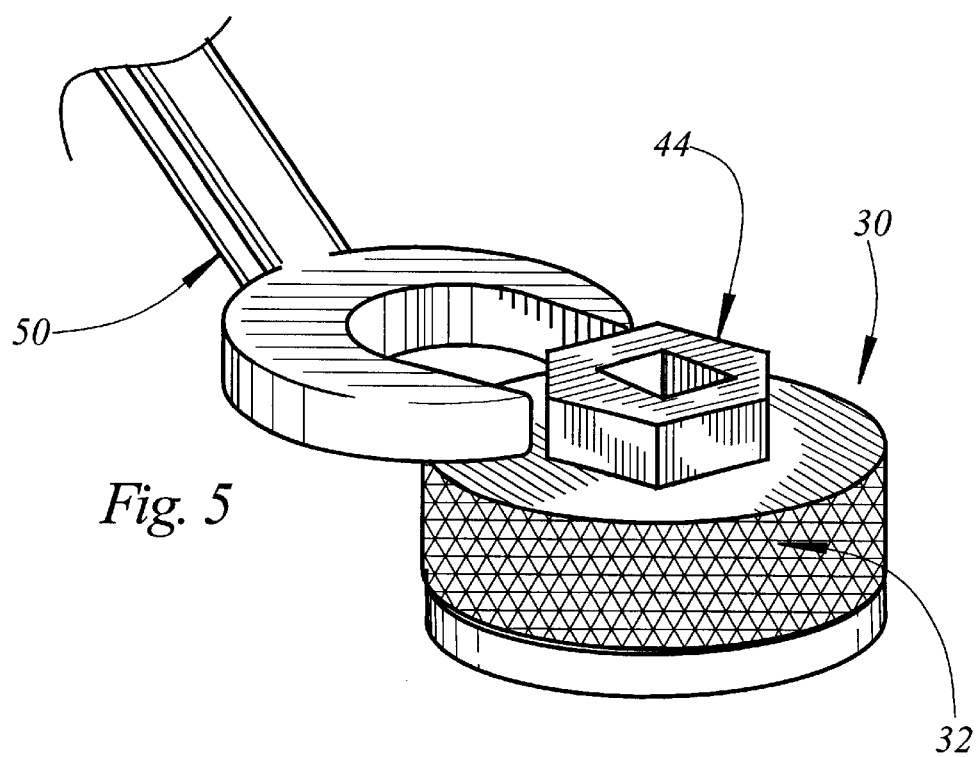
FIG. 5 is a perspective view illustrating actuation of the tool of the present invention by a conventional wrench.

Referring now the Drawings, and particularly to FIGS. 1 and 2 thereof, there is shown a MYERS HUB fastener 10. The MYERS HUB fastener 10 comprises a right circular cylinder 12 having a front end 14 and a rear end 16. A disk shaped flange 18 is secured to the rear end 16 of the cylinder 12. The flange 18 has a multiplicity of radially extending teeth 20 formed on the end surface thereof which perform a lock nut function.

The interior of the cylinder 12 and the disk 18 is provided with one or more continuous threads 22. By means of the threads 22 the MYERS HUB fastener 10 functions as a fastener to secure various electrical components used in building construction and similar applications one to another. By way of example, the MYERS HUB fastener 10 may be utilized to secure the end of a length of conduit to a junction box. As is well known to those skilled in the art, the MYERS HUB fastener has many uses and applications many of which are commonly employed in the electrical construction trade.

Referring particularly to FIG. 1, the MYERS HUB fastener 10 further comprises a plurality of projections 24. The projections 24 extend longitudinally relative to the cylinder 12 and are generally semi-circular in shape.

The projections 24 are located at equally spaced intervals around the circumference of the cylinder 12. Although the MYERS HUB fastener 10 illustrated in FIGS. 1 and 2 is shown as comprises six projections 24, those skilled in the art will appreciate the fact that in its smaller sizes, the MYERS HUB fastener may comprise fewer than six projections 24, and that in its larger sizes the MYERS HUB fastener may comprise more than six projections 24.

Referring to FIGS. 3 and 4, there is shown a tool 30 comprising the present invention. The tool 30 comprises a cylindrical body 32 having a front end 34 and a rear end 36. Referring particularly to FIG. 4, the front end 34 of the tool 30 comprises a cylindrical cavity 38.

The cavity 38 of the tool 30 has interior dimensions which are substantially identical to the exterior dimensions of the cylinder 12 of the MYERS HUB fastener 10 as illustrated in FIGS. 1 and 2. More particularly, the cavity 38 comprises a cylindrical portion 40 which is substantially identical in diameter and depth to the diameter and length of the cylinder 12 of the MYERS HUB fastener 10. The cavity 38 has a plurality of longitudinally extending, semi-circularly shaped grooves 42 situated at equally spaced points around the periphery thereof. The length and depth dimensions of the grooves 42 are substantially identical to the length and height dimensions of the projections 24 of the MYERS HUB fastener 10.

In the use of the tool 30 of the present invention the cavity 38 of the tool 30 is engaged with the cylinder 12 of the MYERS HUB fastener 10. Because the dimensions of the cylindrical portion 40 of the cavity 38 are substantially identical to the dimensions of the cylinder 12 of the MYERS HUB fastener 10, and because the dimensions of the grooves 42 of the cavity 38 are substantially identical to the dimensions of the projections 24 of the MYERS HUB fastener 10, the cylinder 12 of the MYERS HUB fastener 10 is snugly received in the cavity 38 of the tool 30. Due to the substantial identity of the dimensions of the cylinder 12 of the MYERS HUB fastener 10, including the projections 24 thereof, to the dimensions of the cavity 38 of the tool 30 including the grooves 42 thereof, slippage between the tool 30 and the MYERS HUB fastener 10 is virtually impossible regardless of whether the tool 30 is employed to engage or disengage the MYERS HUB fastener 10.

Figure 6:
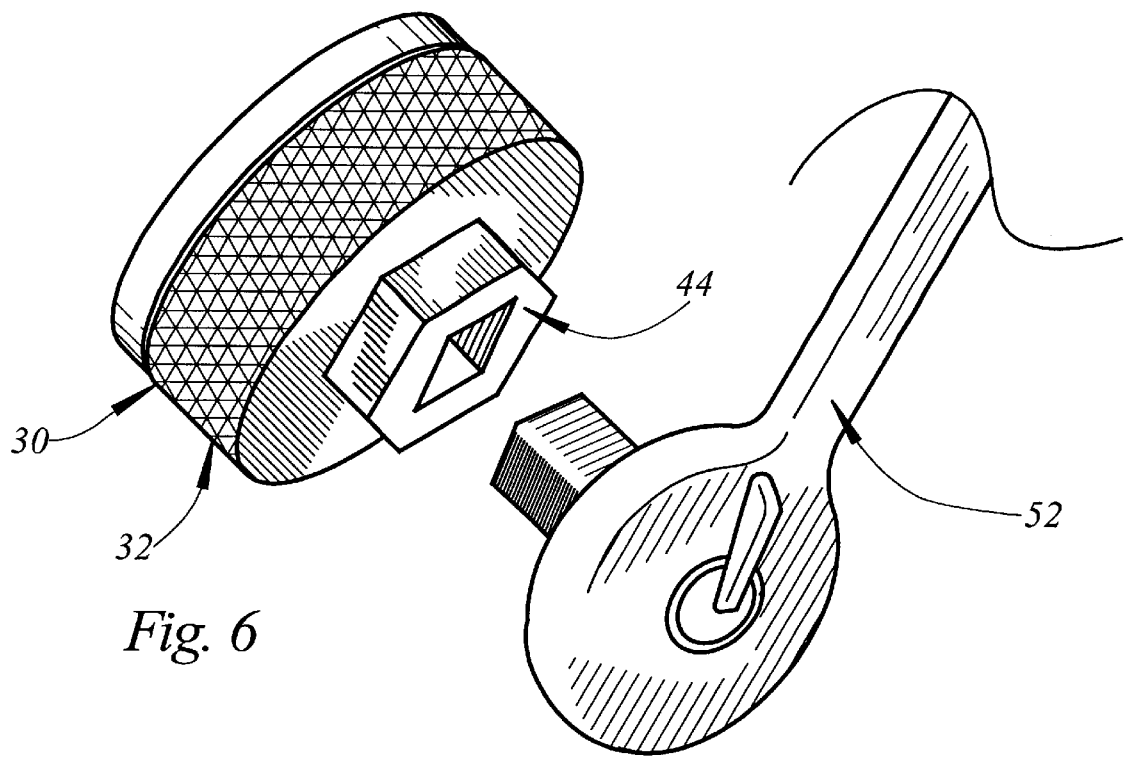
FIG. 6 is a perspective view illustrating actuation of the tool of the present invention by a ratchet wrench.

Referring to FIGS. 3, 5, and 6, the back side 36 of the cylinder 32 of the tool 30 comprises a drive lug 44 which is coaxial with the cylinder 32. The drive lug 44 comprises a hexagonally shaped outer surface 46 and has a square shaped aperture 48 extending therethrough. The hexagonally shaped outer surface 46 of the drive lug 44 is adapted for engagement by a conventional wrench 50 as illustrated in FIG. 5, while the square shaped aperture 48 of the drive lug 44 is adapted to receive the square drive lug extending from a conventional ratchet wrench 52 as illustrated in FIG. 6.

It will therefore be understood by those skilled in the art that the present invention comprises a tool for engaging and disengaging MYERS HUB fasteners which avoids the breakage and slippage problems which have long since characterized the prior art.

Although preferred embodiments of the invention have been illustrated in the accompanying drawings and described in the foregoing Detailed Description, it will be understood that the invention is not limited to the embodiments disclosed, but is capable of numerous rearrangements, modifications, and substitutions of parts and elements without departing from the spirit of the invention.

I claim:

1. The combination of:

a fastener comprising;
  a. a right circular hollow cylinder having predetermined diametrical and length dimensions,
  b. a threaded interior,
  c. a plurality of longitudinally extending, semi-circularly shaped projections located at equally spaced intervals around its external circumference and having predetermined dimensions, and
  d. a flange located at one end of the cylinder and extending radially outwardly therefrom to a predetermined diameter, and a tool for the fastener comprising:
  a. a cylindrical body having a front end and a rear end, the front end comprising a flange engaging surface, the cylindrical body having an outside diameter substantially equal to the diameter of the flange;
  b. a right circular cylindrical aperture formed in the front end of the cylindrical body and having diametrical and depth dimensions which are substantially identical to the diametrical and length dimensions of the cylindrical body of the fastener and having a plurality of longitudinally extending, semi-circularly shaped grooves formed therein having dimensions which are substantially identical to the corresponding dimensions of the longitudinally extending, semi-circularly shaped projections on the body of the fastener;
  c. whereby the cylindrical body and the projections thereon of the fastener are snugly received in the cylindrical cavity comprising the front end of the tool to prevent slippage therebetween during engagement and disengagement of the fastener; and
  d. a drive lug secured to and extending from the rear end of the cylindrical body of the tool and having a hexagonal exterior surface for engagement by a conventional wrench and having a square aperture extending therethrough for engagement by a square drive lug.

* * * * *